United States Patent
Lomba et al.

(10) Patent No.: US 6,552,446 B1
(45) Date of Patent: Apr. 22, 2003

(54) METHOD AND DEVICE FOR ELECTRIC SUPPLY IN A MOBILE APPARATUS

(75) Inventors: Vincent Lomba, Asnieres sur Seine (FR); Christophe Rouverand, Asnieres sur Seine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/719,752

(22) PCT Filed: Apr. 20, 2000

(86) PCT No.: PCT/FR00/01036
§ 371 (c)(1),
(2), (4) Date: Dec. 15, 2000

(87) PCT Pub. No.: WO00/65735
PCT Pub. Date: Nov. 2, 2000

(30) Foreign Application Priority Data

Apr. 26, 1999 (FR) .................................. 99 05241

(51) Int. Cl.[7] .................................................. H02J 3/32
(52) U.S. Cl. ........................................... 307/48; 307/45
(58) Field of Search ..................................... 307/45, 48

(56) References Cited

U.S. PATENT DOCUMENTS

| | | | |
|---|---|---|---|
| 5,208,494 A | 5/1993 | Ikonen et al. | |
| 5,927,415 A | * 7/1999 | Ibaraki et al. | 180/65.2 |
| 5,946,227 A | * 8/1999 | Naji | 365/158 |
| 6,009,319 A | * 12/1999 | Khullar et al. | 370/311 |
| 6,018,470 A | * 1/2000 | Vaananen et al. | 363/132 |
| 6,163,721 A | * 12/2000 | Thompson | 607/2 |

FOREIGN PATENT DOCUMENTS

| | | |
|---|---|---|
| EP | 0 387 108 A1 | 9/1990 |
| EP | 0 674 400 A1 | 9/1995 |
| EP | 0 794 481 A2 * | 9/1997 |
| GB | 2 328 844 A | 3/1999 |

* cited by examiner

*Primary Examiner*—Brian Sircus
*Assistant Examiner*—Sharon Polk
(74) *Attorney, Agent, or Firm*—Sughrue Mion, PLLC

(57) ABSTRACT

To solve a problem due to a transient regulation phenomenon (6) at the time of an increase in power demand (1) in a mobile telephone, the regulator is pre-compensated (7) at a time (T') in advance of a predicted time (T) of the increase in electrical power demand in the mobile telephone. As a result, a power supply voltage (Vr) crossing an operating threshold (3) outside a period of use has no harmful effect on the operation of the mobile appliance.

9 Claims, 2 Drawing Sheets

METHOD AND DEVICE FOR ELECTRIC SUPPLY IN A MOBILE APPARATUS

BACKGROUND OF THE INVENTION

The present invention relates to a method and to an appliance for supplying electrical power in a mobile appliance, for example for supplying electrical power in a digital processor, and in particular in a mobile telephone. The object of the invention is to solve power supply problems that occur in portable appliances fitted with a battery whose voltage gradually falls in use and can fall below a critical value such that operation of the digital circuits of the mobile or portable appliance is no longer guaranteed.

In portable appliances in general, and in mobile telephones in particular, a battery providing a usable supply voltage Vu is connected to digital processors via a regulator. The battery can also be connected to other circuits directly if there is no need to regulate the supply voltage for those other circuits. A regulator establishes a voltage offset between the voltage at the battery terminals and some lower voltage at the output of the regulator. The output voltage of the regulator is controlled (regulated) by modulating this voltage offset; the lower the battery voltage, the lower the value of the voltage offset.

In practice the voltage offset is obtained by means of a voltage drop in a bipolar transistor or a field-effect (MOS) transistor, which has the following consequences. When the battery voltage is low, and the voltage offset, the emitter-collector voltage or the drain-source voltage, respectively, is limited, the biasing of the transistor causes a high bias current to flow into the transistor. This leads to a paradox in that as the battery is progressively discharged its voltage reduces progressively, yet the current that must be drawn from it to maintain a satisfactory supply voltage at the output of the regulator increases progressively. A second paradox occurs in this situation in that, in order to regulate the voltage, the regulator draws more current than the processor itself. As a result of this the remaining battery life of the portable appliance is quickly shortened.

A solution which solves this problem in part is to use larger transistors, instead of increasing the bias current. Apart from the fact that larger transistors are more costly, they take up more space in an integrated circuit incorporating them. This penalty is aggravated by the fact that several regulators are generally implemented in the same integrated circuit to enable tight control of power consumption in a portable appliance. The ballast transistors then take up an unacceptable amount of space.

The rise time of the regulator is too long to cope if the electrical power consumption changes suddenly at a given time. As a result there is a transient change in the regulated voltage at the output of the regulator, during which transient state the voltage first falls below and then rises above the regulated value, before stabilizing thereon. The transient response time can be of the order of 10 microseconds, especially during the period in which the voltage is falling. In a portable appliance, in particular in a mobile telephone, the digital circuits are clocked by a fast internal clock. The clock runs at 13 MHz in one prior art example. The 10 microseconds period in which there is a voltage deficit then corresponds to more than 100 processor cycle times. In some situations, especially when the battery is almost completely discharged, processes which entail an increase in power consumption start up under less than ideal conditions, because the processors are under-powered during these clock cycles.

One prior art solution to this problem is to place high-capacitance capacitors at the input or output of the regulators, preferably at the input. These capacitors can have a value of 3 000 $\mu$F, for example. The disadvantage of high-capacitance capacitors is their large overall size, their cost and the cost of installing them in the mobile appliance. If different signal processors of a mobile telephone are being used simultaneously, for example a voice recognition circuit and an acoustic feedback cancellation circuit or other circuits, the high-capacitance capacitor is eventually discharged and thus of no use when it is required.

SUMMARY OF THE INVENTION

An object of the invention is to solve the above problems and in particular to prevent the regulated supply voltage dropping below a critical operating voltage at the start of the time period in which it is needed. In accordance with the invention, and in the case of GSM mobile telephones in particular, it has been noted that the times at which the electrical power demand increases occur are known in advance. Quite simply, in TDMA (time division multiple access) mobile telephone systems, the circuits of a mobile telephone are activated during only one time slot in each frame. The duration of a time slot is known (it is 577 microseconds in one example), and the time slot is repeated from one frame to the next, the frames continuing to be synchronized. It is therefore possible to tell exactly when a time slot will begin.

The invention causes the transient phenomenon affecting the regulator to occur under conditions such that it does not impede the provision of a voltage regulated to a required value during the time slot. For a time period equal to the duration of the transient phenomenon, the regulator function of the regulator is deliberately put out of adjustment in order to pre-compensate the voltage drop that inevitably occurs at the time of the increase in electrical power demand. In the same line of thinking, it is possible, before an actual increase in power consumption occurs, to provoke an increase in the power consumption of the same order of magnitude as the actual increase so that the transient phenomenon occurs before the time slot. In both cases the mode of operation of the regulator is modified in advance. It is shown below that this neutralizes the harmful effects of a sudden change of the mode of operation of the regulator.

The invention therefore provides a method of supplying electrical power to a digital processor in a mobile appliance, in which method:

a supply voltage of the processor is measured, the supply voltage is compared to a reference, and a control circuit supplying the supply voltage is regulated depending on the offset between the supply voltage and the reference, the method being characterized in that:

a predictable time of an increase in electrical power demand is identified, and the mode of operation of the control circuit is modified in advance of that time.

The invention also provides a mobile appliance provided with a digital processor and a system for supplying electrical power to said digital processor, said electrical power supply system including a circuit for slaving a power supply voltage of said processor to a reference value, the device being characterized in that it includes a predictor for predicting a time of an increase in the power consumption of the processor and means for modifying the mode of operation of the control circuit in advance.

BRIEF DESCRIPTION OF THE DRAWINGS

The invention will be better understood on reading the following description and examining the accompanying drawings. The drawings are provided by way of illustrative and non-limiting example of the invention only. In the figures.

DETAILED DESCRIPTION OF THE INVENTION

Figure 1:
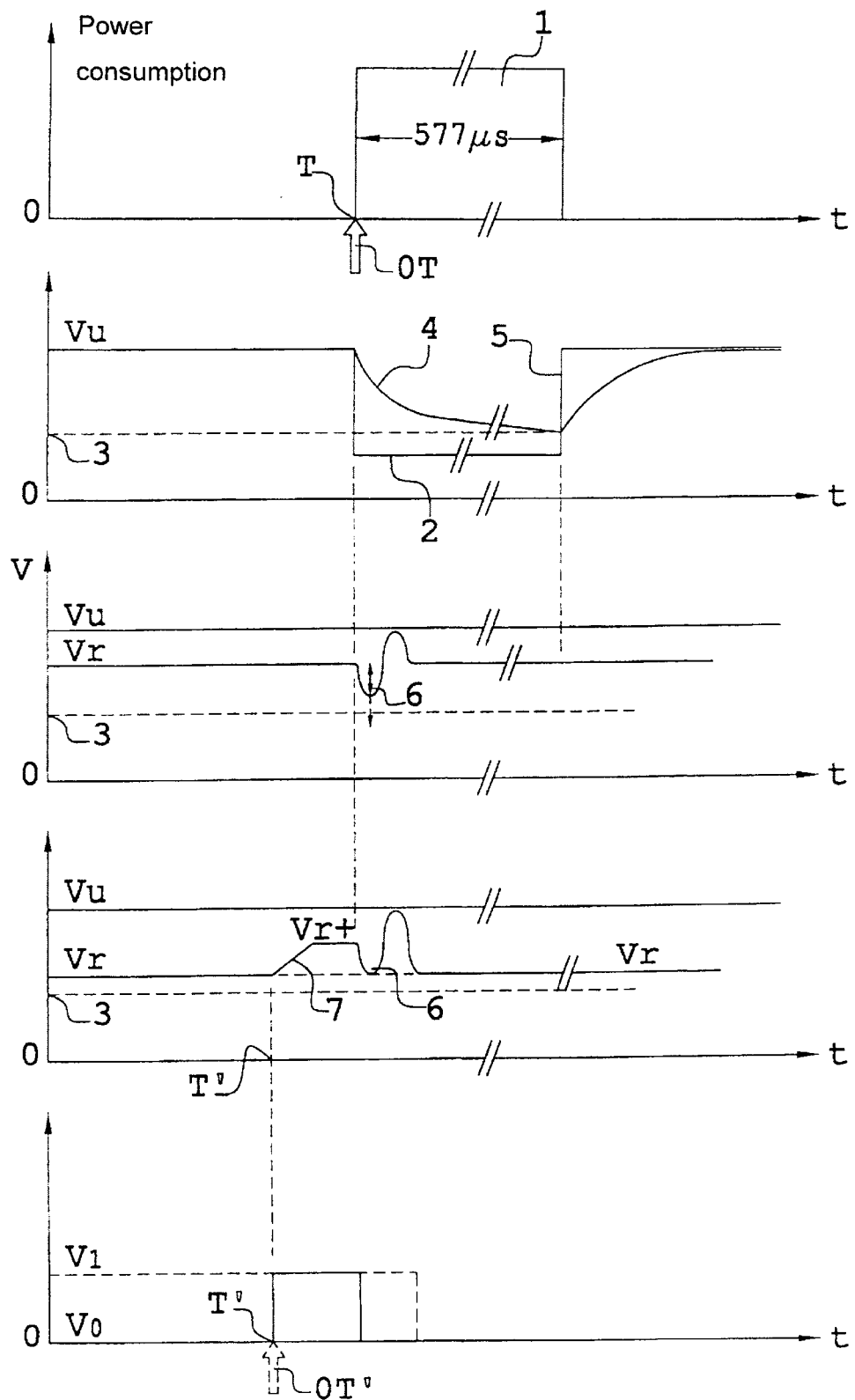
FIG. 1 shows timing diagrams for the various steps of a method of the invention.

FIG. 1 includes several timing diagrams. The first timing diagram is a power consumption timing diagram and shows that the electrical power consumption of the appliance varies suddenly at the start of time slot 1 and remains at a high level throughout that time slot. In the case of a TDMA mobile telephone system, time slot 1 is the time slot within a frame during which a mobile telephone is required to transmit call data to a base station or to receive data from a base station. The circuit can be considered to be idle outside the time slot and consequently there is virtually no power consumption outside the time slot. In other kinds of portable appliance, in particular portable microcomputers, although sudden variations in power consumption can occur at random times (for example on accessing a hard disk), those random times can nevertheless be predicted. They are delayed if necessary to provide the necessary anticipation.

The timing diagram under the first timing diagram shows a load voltage Vu available at the output of the battery. If there is no regulator device and if the voltage available is subject to a sudden attenuation 2 during time slot 1, this can lead to a residual voltage below a threshold value 3. High-capacitance capacitors can be connected across the internal resistance of the battery to prevent a voltage drop associated with that internal resistance by causing a slow discharge 4 of the available voltage. The capacitors must have high capacitance because in practice the time constant that they and the load connected to the battery define must be greater than the duration of time slot 1. In this case, the supply voltage will hopefully not have dropped below the threshold 3 at the end 5 of the time slot.

Under the second timing diagram is a third timing diagram in which a regulated voltage Vr is lower than the usable voltage Vu but higher than the minimum threshold voltage 3, in particular during the greater part of time slot 1. However, this third timing diagram shows that at the start of time slot 1 the regulator is insufficiently responsive and a transient phenomenon 6 occurs. The phenomenon 6 causes the voltage Vr available at the output of the regulator to tend towards the threshold value 3, or even to drop below it in the most critical situation. To give a more concrete example of this, the battery voltage Vu is of the order of 3.3 volts, the regulated voltage Vr is preferably 2.8 volts and the threshold 3, which is the voltage below which the digital circuits no longer function correctly, is 2.7 volts. The duration of the negative pulse 6 can be of the order of 10 microseconds, which may be unacceptable, as previously mentioned.

The invention does not actually prevent the transient phenomenon 6. Preventing it would amount to biasing the regulators with a bias current that would be greater than the output current of the regulator. However, it has been realized, in the field of TDMA mobile telephone systems in particular, that power is consumed in time slot 1 at a time T which is known in advance. In practice, at time T the circuits of the portable appliance receive activation instructions OT which lead to an increase in power consumption. Because the time T is known, the invention can modify the mode of operation of the control circuit ahead of time. In practice there are two ways to do this.

As shown in a fourth timing diagram in FIG. 1, the set point value of the regulated voltage is preferably modified from a value Vr to a value Vr+ ahead of time, by sending an instruction OT' to modify the mode of operation of the control circuit at a time T'. Thus at time T, which is after time T', control is activated on the basis of a higher regulated voltage Vr+ and under no circumstances can the minimum voltage resulting from this activation fall below the threshold value 3. Between the times T' and T the regulator in practice consumes more current. The difference between the voltage Vu and the voltage Vr+ is smaller than the difference between the voltage Vu and the voltage Vr. The additional power consumption does not represent a penalty in the case of a portable appliance, however, because the duration T'T is short. For example, it is of the order of the duration of the transient phenomenon 6, e.g. of the order of 10 microseconds. It can even be less, for example half that value, to allow only a rise 7 in the regulated voltage, with no plateau at the new value Vr+. In practice the instruction OT', which can be seen in the fifth timing diagram, can terminate as soon as the instruction CT arrives, or possibly slightly later. In all cases, the instruction OT' is cut off during the greater part of the duration of time slot 1, so that the regulated voltage is again Vr.

Thus in the invention, time T is identified and the mode of operation of the control circuit is modified ahead of time, i.e. at time T'. This modifies the control reference value.

Instead of this, knowing the time T at which the power consumption varies suddenly, it would be possible to cause a false power consumption ahead of time, under the same conditions, but with an instruction OT' that would apply to an ancillary dissipative circuit connected to the output of the regulator, rather than a control set point value. Under these conditions, the transient 6 shown in the third timing diagram would not represent a penalty, even if it crossed the threshold voltage 3, because this would occur at a time during which the processor would not be in use.

Figure 2:
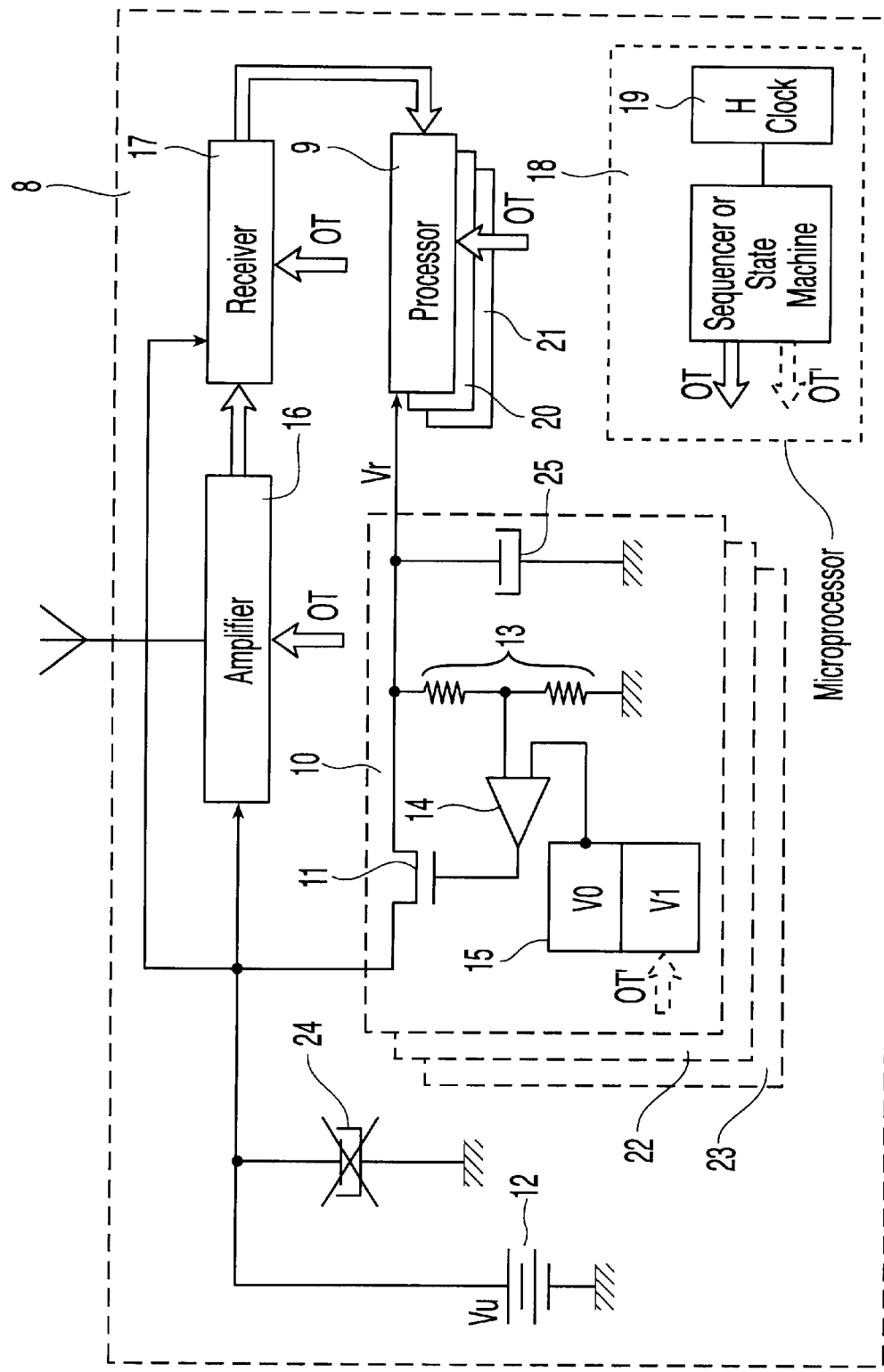
FIG. 2 is a diagrammatic representation of the regulator in a battery-powered portable appliance.

FIG. 2 shows a mobile appliance 8 equipped with a digital processor 9 and an electrical power supply system 10 for the processor 9. The system 10 includes a control circuit which slaves a supply voltage Vr of the processor to a reference value V0. For example, the control circuit includes a transistor 11, e.g. a MOS transistor, connected to a battery 12 and to the processor 9. The voltage Vr is measured by a divider bridge 13 whose mid-point is connected to a first input of a comparator 14 which receives at another input a set point signal V0 produced by a reference source generator 15. The output of the comparator 14 is connected to the gate of the transistor 11. The transistor 11 could be a bipolar transistor.

In the case of a mobile telephone, the appliance 8 further includes an amplifier 16 connected to an antenna and to a receiver 17 which is also functionally connected to the processor 9. The amplifier 16, receiver 17 and processor 9 receive control signals from a microprocessor 18 clocked by a clock 19. The microprocessor 18 includes a sequencer or state machine which can produce instructions OT for activating the amplifier 16, the receiver 17 and the processor 9. This is known in the art. In the invention, by anticipating the time T of application of the instruction OT, the sequencer or state machine of the microprocessor 18 can produce the instructions OT' referred to above for activating the regulator 10. In the preferred embodiment, the instruction OT' is applied to the generator 15, which then applies another set point value V1 to the second control input of the comparator 14. For as long as V0 imposes Vr, V1 imposes Vr+.

The processing operations carried out by the processor 9 can be of different kinds. In this case the appliance 8 includes several circuits, for example the circuits 20 and 21, comparable to the processor 9. It is possible that the circuits 20 and 21 will not both be activated at the same time as the processor 9. If they are activated at the same time, a single regulator 10 may be sufficient to supply electrical power to all of these circuits. On the other hand, if they are activated independently of each other, it is preferable to provide respective duplicate dedicated regulators 22 and 23. This way the additional power consumption caused in the circuits 10, 22 and 23 between the instructions OT' and OT is limited to the respective circuits 9, 20 and 21 which are actually in service.

FIG. 2 also shows that with the invention there is no need for a high-capacitance capacitor 24 to provide the damped decrease 4 of the second timing diagram referred to above. This saves on cost and space.

In FIG. 2, the amplifiers 17 and receivers 16 are analogue devices and may not require such rigorous stabilization of their supply voltage. Their sensitivity to the supply voltage is less critical. Consequently, they can be connected to the battery 12 directly, instead of via a regulator 10. The regulator 10 then preferably includes a capacitor 25 connected in parallel between ground and the output of the regulator 10. The capacitor 25 does not need to have very high capacitance: a capacitor with a capacitance of the order of 10 $\mu$F may suffice in the case of a mobile telephone.

Finally, note that the method of the invention is able to assure good regulation and good signal processing, even if the battery is near the end of its charge, because the times at which a voltage drop due to activation of the regulator occurs can be shifted to a time other than one at which the regulated voltage is of benefit.

What is claimed is:

1. A method of supplying electrical power to a digital processor (9) in a mobile appliance (8), in which method:
   a supply voltage (Vr) of the processor is measured (13),
   said supply voltage is compared (14) to a reference (V0), and
   a control circuit supplying said supply voltage is regulated (11) depending on the offset between said supply voltage and said reference,
   the method being characterised in that:
      a predictable time (T) of an increase in electrical power demand is temporally identified, and
      the mode of operation of the control circuit is modified (OT') in advance at a time (T').

2. A method according to claim 1, characterized in that to modify the mode of operation of the control circuit the value of the reference (V0, V1) is changed to increase the power supply voltage (Vr+).

3. A method according to claim 1, characterized in that to modify the mode of operation of the control circuit, an increase in electrical power consumption is caused before the predicted time.

4. A method of supplying electrical power to a digital processor (9) in a mobile appliance (8), in which method:
   a supply voltage (Vr) of the processor is measured (13),
   said supply voltage is compared (14) to a reference (V0), and
   a control circuit supplying said supply voltage is regulated (11) depending on the offset between said supply voltage and said reference,
   the method being characterized in that:
      a predictable time (T) of an increase in electrical power demand is identified,
      the mode of operation of the control circuit is modified (OT') in advance at a time (T'),
      the processor is divided into a plurality of separate circuits (9, 20, 21) supplied with power individually,
      a predictable time of an increase in the electrical power demand of a separate circuit is identified, and
      the mode of operation of a control circuit (10, 22, 23) dedicated to said separate circuit is modified ahead of time.

5. A mobile appliance provided with a digital processor (9) and a system (10) for supplying electrical power to said digital processor, said electrical power supply system including a control circuit for slaving a power supply voltage (Vr) of said processor to a reference value (V0), the appliance being characterized in that it includes a predictor (18) for predicting a time (T) of an increase in the power consumption of the processor and means for modifying (OT') the mode of operation of the control circuit in advance at a time (T'), and that the predictor includes a sequencer or state machine and a clock (19) for activating said sequencer or state machine.

6. A mobile appliance provided with a digital processor (9) and a system (10) for supplying electrical power to said digital processor, said electrical power supply system including a control circuit for slaving a power supply voltage (Vr) of said processor to a reference value (V0), the appliance being characterized in that it includes a predictor (18) for predicting a time (T) of an increase in the power consumption of the processor and means for modifying (OT') the mode of operation of the control circuit in advance at a time (T'), and
   in that the modifying means include a reference signal generator (15) connected to a set point input of the control circuit and having a control input so that it can be controlled by the predictor.

7. A mobile appliance provided with a digital processor (9) and a system (10) for supplying electrical power to said digital processor, said electrical power supply system including a control circuit for slaving a power supply voltage (Vr) of said processor to a reference value (V0), the appliance being characterized in that it includes a predictor (18) for predicting a time (T) of an increase in the power consumption of the processor and means for modifying (OT') the mode of operation of the control circuit in advance at a time (T'), and
   in that the control circuit includes a plurality of regulators (9, 20, 21) dedicated to different processors (10, 22, 23).

8. A mobile appliance provided with a digital processor (9) and a system (10) for supplying electrical power to said digital processor, said electrical power supply system including a control circuit for slaving a power supply voltage (Vr) of said processor to a reference value (V0), the appliance being characterized in that it includes a predictor (18) for predicting a time (T) of an increase in the power consumption of the processor and means for modifying (OT') the mode of operation of the control circuit in advance at a time (T'), and
   in that the control circuit includes an output capacitor with a capacitance of the order of 10 $\mu$F.

9. A method of supplying electrical power to a digital processor (9) in a mobile appliance (8), in which method:

a supply voltage (Vr) of the processor is measured (13), said supply voltage is compared (14) to a reference (V0), and a control circuit supplying said supply voltage is regulated (11) depending on the offset between said supply voltage and said reference, the method being characterized in that:

a predictable time (T) of an increase in electrical power demand is identified, the mode of operation of the control circuit is modified (OT') in advance at a time (T'), wherein the mobile appliance is a mobile telephone in a TDMA mobile telephone system employing a plurality of frames each having a first time slot of known duration, and wherein said predictable time (T) is at the beginning of said first time slot.

* * * * *